US008474832B2

(12) United States Patent
Mersky

(10) Patent No.: US 8,474,832 B2
(45) Date of Patent: Jul. 2, 2013

(54) MOBILE DEVICE HOLDER

(76) Inventor: Randy Mersky, Silver Spring, MD (US)

( * ) Notice: Subject to any disclaimer, the term of this patent is extended or adjusted under 35 U.S.C. 154(b) by 95 days.

(21) Appl. No.: 12/978,768

(22) Filed: Dec. 27, 2010

(65) Prior Publication Data

US 2012/0161406 A1    Jun. 28, 2012

(51) Int. Cl.
*B62D 39/00* (2006.01)
(52) U.S. Cl.
USPC .................. 280/33.992; 280/33.991
(58) Field of Classification Search
USPC ................ 280/33.991, 33.992; 224/411, 420, 224/482, 277, 483, 281, 282, 484, 485, 545, 224/546, 552, 547; 248/201, 300, 307, 309.1, 248/310, 274.1, 224.51
See application file for complete search history.

(56) References Cited

U.S. PATENT DOCUMENTS

| | | | | | |
|---|---|---|---|---|---|
| 3,251,543 | A | * | 5/1966 | Bush et al. | 235/1 R |
| 3,491,820 | A | * | 1/1970 | Ostling | 52/796.1 |
| 3,539,204 | A | * | 11/1970 | Keller | 281/45 |
| 4,125,270 | A | | 11/1978 | Trubiano | |
| 4,156,318 | A | * | 5/1979 | Economy | 40/308 |
| 4,406,928 | A | * | 9/1983 | MacKenzie | 379/454 |
| 4,632,411 | A | * | 12/1986 | Badger | 280/33.991 |
| 4,685,701 | A | * | 8/1987 | Amundson et al. | 281/42 |
| 4,968,047 | A | * | 11/1990 | Ferris | 280/33.992 |
| 4,988,025 | A | * | 1/1991 | Lipton et al. | 224/411 |
| 5,004,252 | A | * | 4/1991 | Kraper | 280/33.992 |
| 5,033,709 | A | * | 7/1991 | Yuen | 248/313 |
| D321,577 | S | | 11/1991 | Ellis et al. | |
| 5,086,958 | A | * | 2/1992 | Nagy | 224/544 |
| 5,263,578 | A | * | 11/1993 | Narvey | 206/232 |
| 5,285,938 | A | * | 2/1994 | Fauchald | 224/482 |
| D371,137 | S | * | 6/1996 | Kriegh | D14/253 |
| 6,082,687 | A | * | 7/2000 | Kump et al. | 248/220.41 |
| 6,115,247 | A | * | 9/2000 | Helot | 361/679.44 |
| 6,453,588 | B1 | * | 9/2002 | Lykens | 40/308 |
| 6,480,378 | B2 | * | 11/2002 | Chang | 361/679.41 |
| 6,481,679 | B1 | * | 11/2002 | Bennett et al. | 248/224.51 |
| D536,502 | S | | 2/2007 | Weigand | |
| D536,503 | S | | 2/2007 | Weigand et al. | |
| 7,290,740 | B2 | * | 11/2007 | Joy et al. | 248/187.1 |
| 7,953,606 | B2 | * | 5/2011 | Shirasaki | 705/1.1 |
| 8,068,336 | B2 | * | 11/2011 | Crooijmans et al. | 361/679.41 |
| 8,079,165 | B1 | * | 12/2011 | Buerchner et al. | 40/658 |
| 8,136,275 | B2 | * | 3/2012 | Sonnendorfer et al. | 40/308 |
| 2003/0132590 | A1 | | 7/2003 | Werner | |

(Continued)

FOREIGN PATENT DOCUMENTS

CN    201343056    * 11/2009

OTHER PUBLICATIONS

Jeff Pierce, "The Future Mobile Advertising Revolution", Seeking Alpha, Dec. 20, 2010, pp. 1-4.

*Primary Examiner* — Katy M Ebner
*Assistant Examiner* — Emma K Frick
(74) *Attorney, Agent, or Firm* — Greenblum & Bernstein, P.L.C.

(57) ABSTRACT

A mobile device holder includes a lower holding portion having a pair of opposed lower holding portion channels, a shelf at the base of the lower holding portion, an upper holding portion having a pair of opposed upper holding portion channels, the pair of opposed upper holding portion channels diverging in a direction away from the lower holding portion and aligned with the pair of opposed lower holding portion channels, the upper holding portion affixed to the lower holding portion, and a base connected to the shelf of the lower holding portion.

25 Claims, 10 Drawing Sheets

U.S. PATENT DOCUMENTS

| | | |
|---|---|---|
| 2004/0262481 A1 | 12/2004 | Carnevali |
| 2005/0212235 A1 | 9/2005 | Hammerling |
| 2006/0049591 A1 | 3/2006 | Pennell |
| 2007/0273113 A1 | 11/2007 | Muir |
| 2008/0237284 A1* | 10/2008 | Peota et al. .................. 224/411 |
| 2009/0084924 A1* | 4/2009 | Schuermann et al. ........ 248/452 |
| 2009/0140505 A1 | 6/2009 | Fryer et al. |
| 2010/0072715 A1* | 3/2010 | Crum ...................... 280/33.992 |
| 2010/0262554 A1* | 10/2010 | Elliott ........................ 705/323 |
| 2011/0075331 A1* | 3/2011 | Greig et al. .............. 361/679.01 |
| 2011/0140380 A1* | 6/2011 | Ulrich ..................... 280/33.992 |
| 2011/0278885 A1* | 11/2011 | Procter et al. ................. 297/135 |
| 2011/0297711 A1* | 12/2011 | Yu et al. ....................... 224/272 |

* cited by examiner

MOBILE DEVICE HOLDER

BACKGROUND

1. Field of the Disclosure

The present disclosure relates to the field of mobile device holders. More particularly, the present disclosure relates to mobile device holder configured to hold mobile devices of different dimensions and orientations.

2. Background Information

Smartphones and other electronic mobile devices have become increasingly popular for managing multiple aspects of one's daily life. One such aspect is shopping. For example, shoppers have increasingly been using electronic mobile devices to manage shopping lists or to otherwise enhance the shopping experience. As such, a need has arisen for a system to not only hold, but to display the screen of such mobile devices to the shopper, so that the shopper can safely push a shopping cart while still being able to view the device.

Holders attachable to shopping carts and designed to hold articles such as beverages, coupons, pens, and the like are known in the art; however, many of such devices are attachable to shopping cart handles, which interferes with the nesting of the shopping carts and wasting floor space.

Other electronic devices have been provided to enhance the shopping experience by displaying, e.g., store and/or product information and electronic coupons, on a proprietary display device integral to the shopping cart; however, such integral electronic devices require the shopper to upload his/her shopping list to this display device (or do not allow for such uploading at all), thereby inconveniencing the shopper.

In view of the above, a need has arisen for a diverse mobile device holder configured to hold a variety of mobile devices of different dimensions.

SUMMARY OF THE DISCLOSURE

According to a non-limiting feature of the disclosure, provided is a mobile device holder which may include a lower holding portion having a pair of opposed lower holding portion channels, a shelf at the base of the lower holding portion, an upper holding portion having a pair of opposed upper holding portion channels, the pair of opposed upper holding portion channels diverging in a direction away from the lower holding portion and aligned with the pair of opposed lower holding portion channels, the upper holding portion affixed to the lower holding portion, and a base connected to the shelf of the lower holding portion. The shelf may include comprises a shelf channel aligned with the pair of lower holding portion channels Also provided may be a lower holding portion generally rectangular in shape and an upper holding portion generally trapezoidal in shape. Further, each channel of the pair of opposed lower holding portion channels and each channel of the pair of opposed upper holding portion channels may be generally U-shaped. Also, each channel of the pair of opposed lower holding portion channels and each channel of the pair of opposed upper holding portion channels may be generally L-shaped.

Further provided may be a clearance section connected to the lower holding portion between the shelf and the base. The clearance section may have a generally U-shaped channel.

Additionally, the base may have a mount attachable to a shopping cart, and the mount may be attachable to a collapsible basket of the shopping cart.

The mobile device may further include a front section and a rear section defined between the pair of opposed lower holding portion channels the pair of opposed upper holding portion channels, wherein one of the front section and the rear section may be open. Also, the other of the front section and the rear section may be generally closed.

Further, the lower holding portion and the upper holding portion may collectively define a general Y-shape.

The pair of opposed lower holding portion channels may be one of continuous and discontinuous with the pair of opposed upper holding portion channels.

Also, the lower holding portion may be pivotable relative to the base. A spring configured to pivotably bias the lower holding portion in a direction relative to the base may be provided.

In a feature of the disclosure, one upper holding portion channel of the pair of opposed upper holding portion channels may create an oblique angle with one lower holding portion channel of the pair of opposed lower holding portion channels, the one upper holding portion channel and the one lower holding portion channel located on the same side of the mobile device holder.

Additionally, the pair of opposed lower holding portion channels may be parallel.

In another feature of the disclosure, an expansion holding portion removably insertable in the upper holding portion may be provided, which has an upper expansion holding portion having a pair of opposed upper expansion holding portion channels, a lower expansion holding portion having a pair of opposed lower expansion holding portion channels, the pair of opposed lower expansion holding portion channels converging in a direction away from the upper expansion holding portion and aligned with the pair of opposed upper expansion holding portion channels, the upper expansion holding portion affixed to the lower expansion holding portion.

Also provided may be a front expansion section and a rear expansion section defined between the pair of opposed lower expansion holding portion channels the pair of opposed upper expansion holding portion channels, wherein one of the front expansion section and the rear expansion section is open. The pair of opposed lower expansion holding portion channels may create the same angle as the pair of opposed upper holding portion channels when the expansion holding portion is inserted in the upper holding portion.

Further, an end of each channel of the pair of opposed lower expansion holding portion channels may be open. Also the pair of opposed upper expansion holding portion channels may be arranged in parallel.

Additionally, the pair of opposed upper holding portion channels create an angle different from that of the pair opposed lower holding portion channels. Further, the distance between the pair of opposed upper expansion holding portion channels may be adjustable.

Another aspect of the disclosure provides a shopping cart having a main basket, a secondary basket configured to swing upward relative to the main basket when the shopping cart is nested with another shopping cart, and a mobile device holder. The mobile device holder may include a lower holding portion having a pair of opposed lower holding portion channels, a shelf at the base of the lower holding portion, an upper holding portion having a pair of opposed upper holding portion channels, the pair of opposed upper holding portion channels diverging in a direction away from the lower holding portion and aligned with the pair of opposed lower holding portion channels, the upper holding portion affixed to the lower holding portion, and a base connected to the shelf of the lower holding portion and attached to the secondary basket.

Other exemplary embodiments and advantages of the present invention may be ascertained by reviewing the present disclosure and the accompanying drawings, and the above description should not be considered to limit the scope of the present invention.

BRIEF DESCRIPTION OF THE DRAWINGS

The present invention is further described in the detailed description which follows, in reference to the noted plurality of drawings, by way of non-limiting examples of preferred embodiments of the present invention, in which like characters represent like elements throughout the several views of the drawings, and wherein.

DETAILED DESCRIPTION

Figure 1:
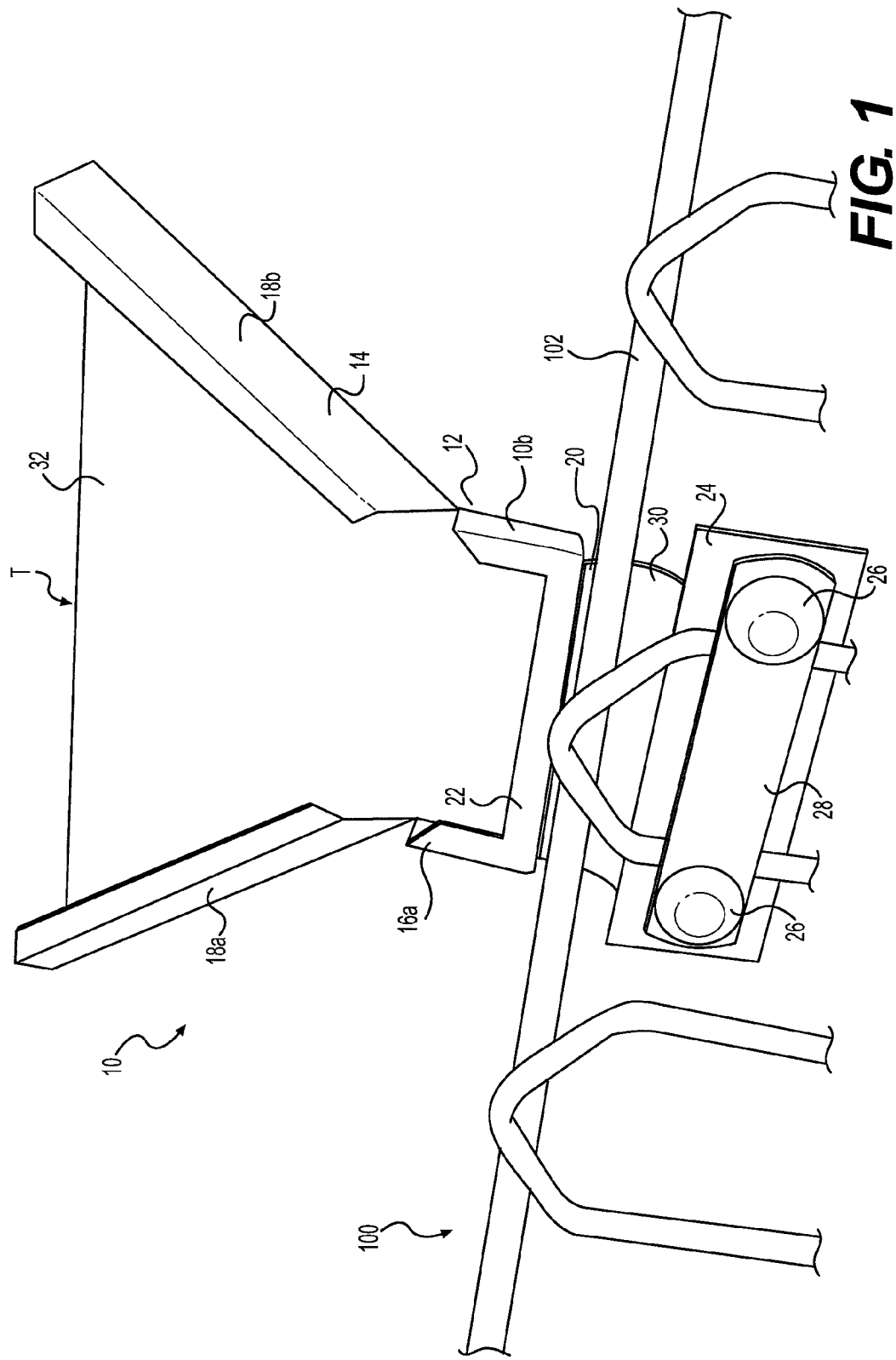
FIG. 1 shows a perspective view of a mobile device holder mounted to a shopping cart according an aspect of the present disclosure.
Figure 2:
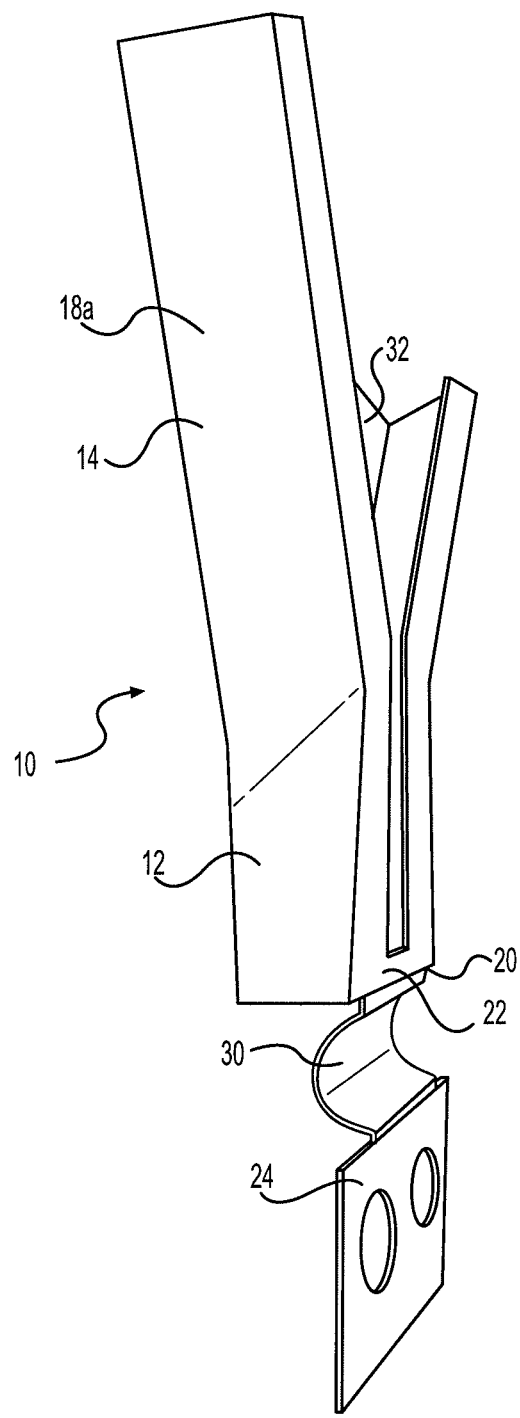
FIG. 2 shows a side elevational view of the mobile device holder according an aspect of the present disclosure.
Figure 3:
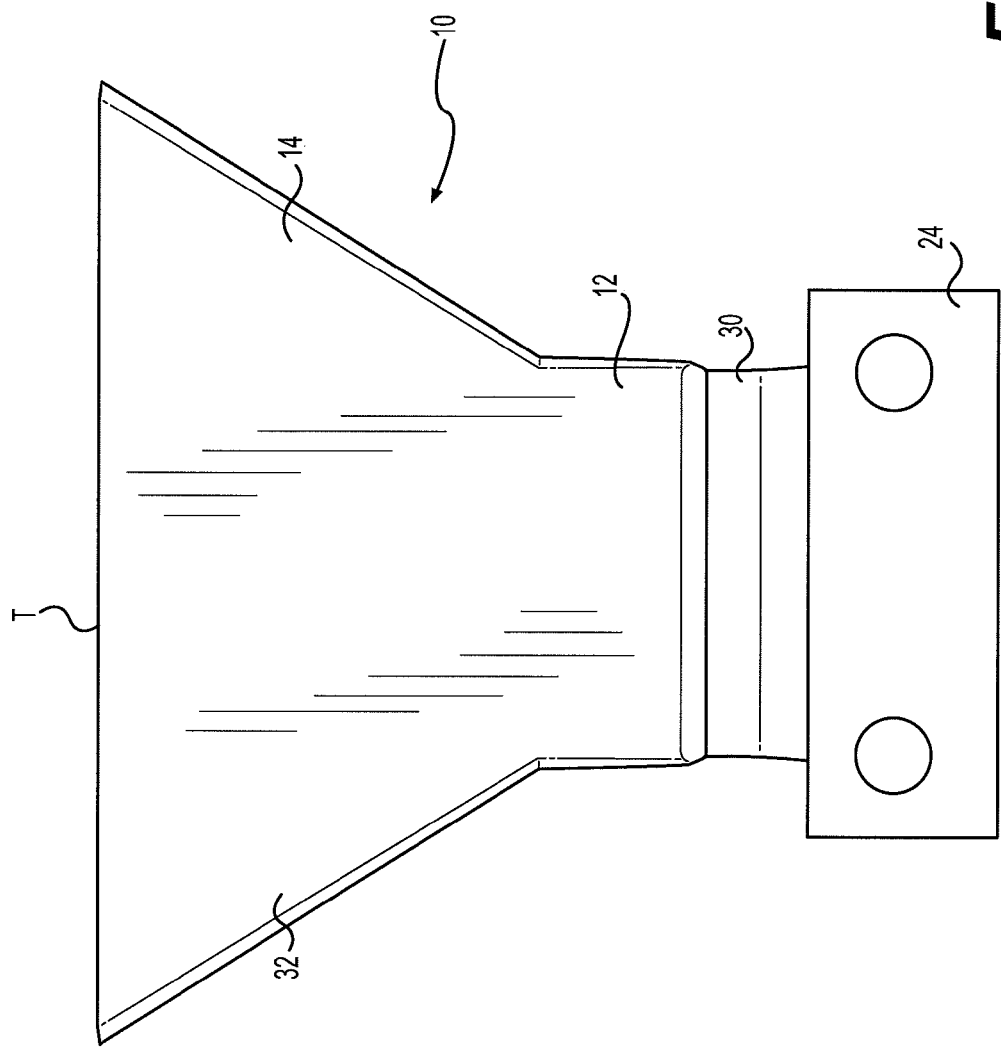
FIG. 3 shows a rear elevational view of the mobile device holder according an aspect of the present disclosure.

In view of the foregoing, the present disclosure, through one or more of its various aspects, embodiments and/or specific features or sub-components, is thus intended to bring out one or more of the advantages as specifically noted below.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Referring now to the drawings wherein like characters represent like elements, FIGS. 1-5 show a mobile device holder 10 according to an aspect of the present disclosure. As used herein, "mobile device" can mean any mobile device, including but not limited to a tablet computer (such as, e.g., an iPad), a smartphone (such as, e.g., a Blackberry, iPhone, Android), personal digital assistant (PDA), a global positioning satellite (GPS) device, a portable music player (such as, e.g., an iPod), an e-reader, a palmtop computer, a laptop computer, a wireless/cellular telephone, a camera, a pager, a personal trusted device, a portable video game system, and a web appliance (such as, e.g., an iPod Touch). Nor is the present invention limited to electronic devices, e.g., a notepad or coupon book may be used with the present invention.

The mobile device holder 10 includes two portions, namely a lower holding portion 12 and an upper holding portion 14. The lower holding portion 12 is generally rectangular in shape while the upper holding portion 14 is generally trapezoidal in shape, resulting in a generally Y-shaped mobile device holder 10. While the illustrated mobile device holder 10 shows the lower holding portion 12 and the upper holding portion 14 as being unitarily constructed, it is understood by those of skill in the art that the lower holding portion 12 and the upper holding portion 14 may be independently constructed and then affixed to each other.

Figure 4:
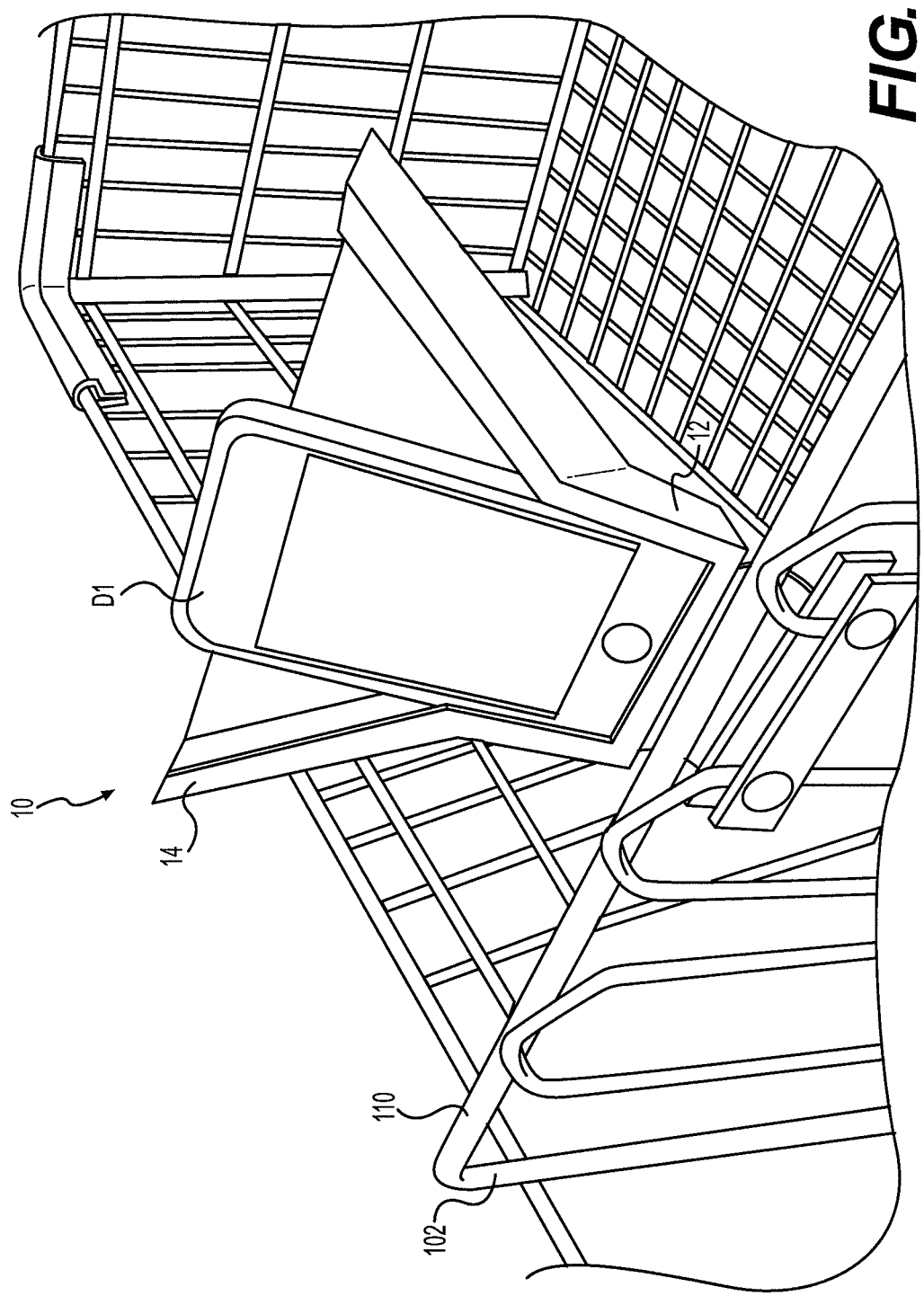
FIG. 4 shows a perspective view of the mobile device holder holding a mobile device in the upright position according an aspect of the present disclosure.
Figure 5:
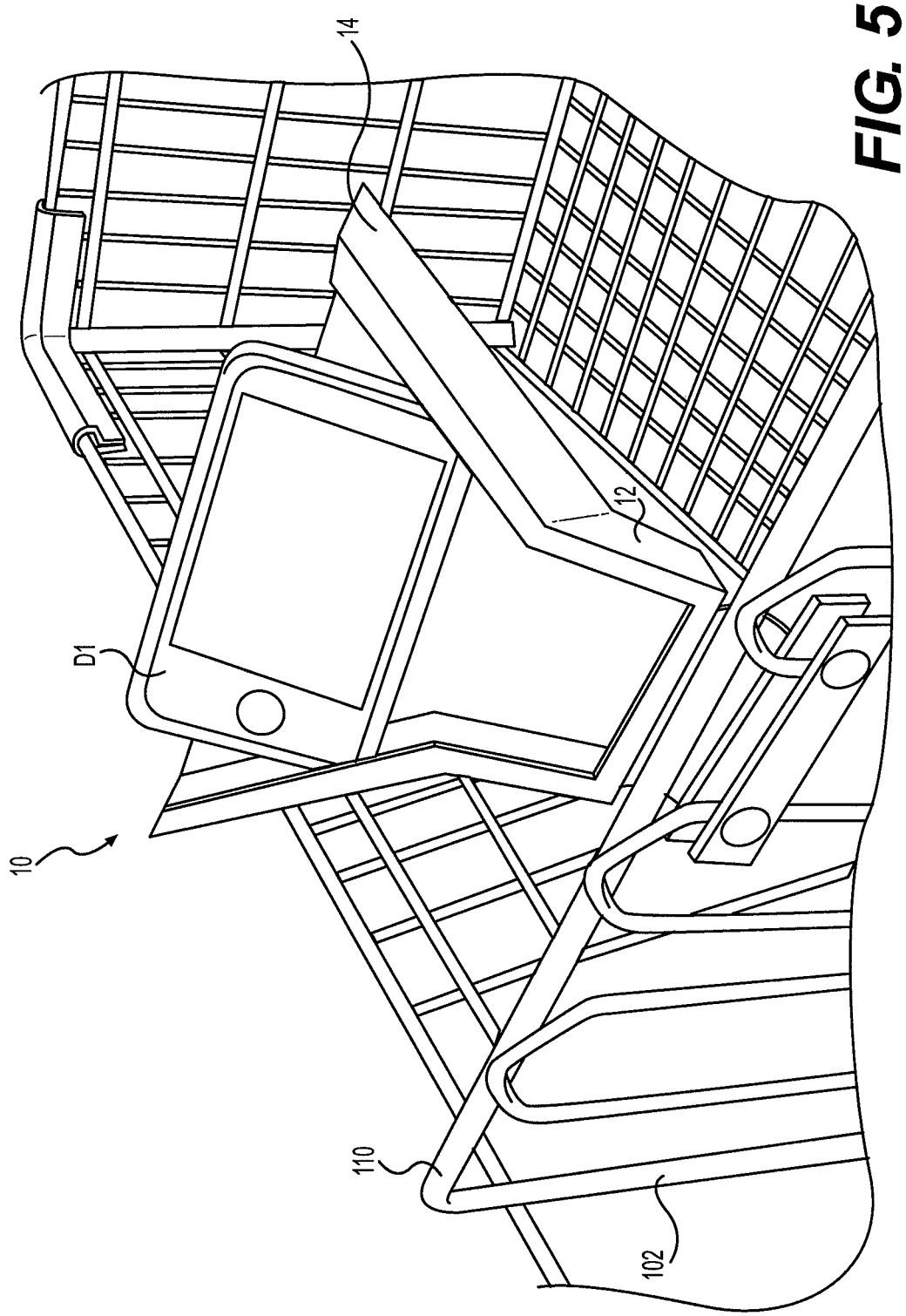
FIG. 5 shows a perspective view of the mobile device holder holding a mobile device in the horizontal position according an aspect of the present disclosure.
Figure 6:
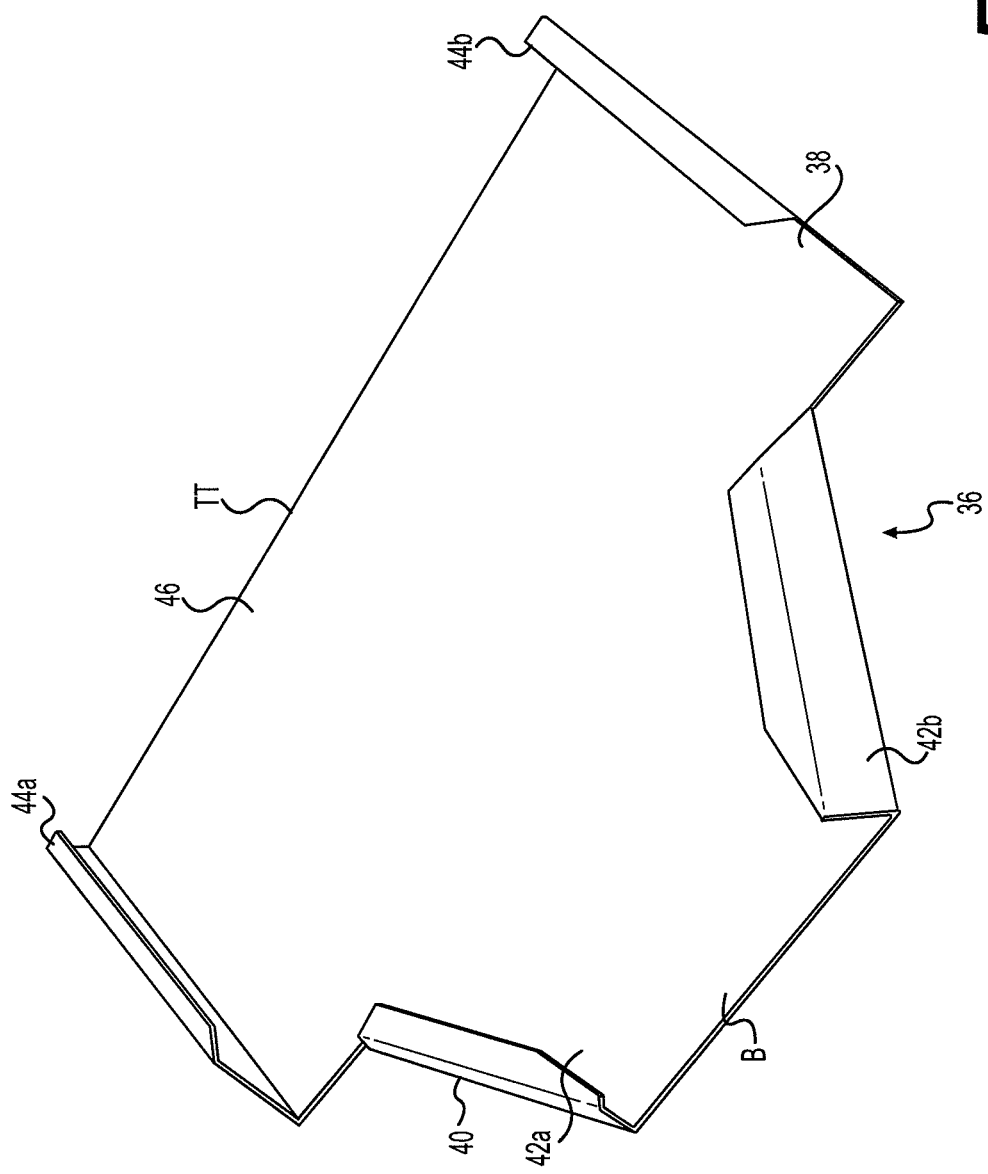
FIG. 6 shows a perspective view of an expansion holding portion for use with the mobile device holder according an aspect of the present disclosure.

The lower holding portion 12 includes a pair of opposed lower holding portion channels 16a, 16b, and the upper holding portion 14 includes a pair of opposed upper holding portion channels 18a, 18b. The lower holding portion 12 also includes a shelf 20, which can also include a shelf channel 22. The lower holding portion channels 16a, 16b and the upper holding portion channels 18a, 18b are aligned with each other in the direction of insertion of a mobile device (i.e., when inserted from the top T of the holder 10) such that the edges of mobile device may engage the lower holding portion channels 16a, 16b and the upper holding portion channels 18a, 18b. Further the shelf channel 22 (if so equipped) is also aligned with the lower holding portion channels 16a, 16b and the upper holding portion channels 18a, 18b. The channels 16a, 18a on each side of the device may be separate (i.e., discontinuous) from each other (as shown in FIG. 1) or they may be continuous (as shown in FIGS. 4-5). Similarly, the shelf channel 22 (if so equipped) may be separate from the lower holding portion channels 16a, 16b or it may be continuous with the lower holding portion channels 16a, 16b.

Figure 7:
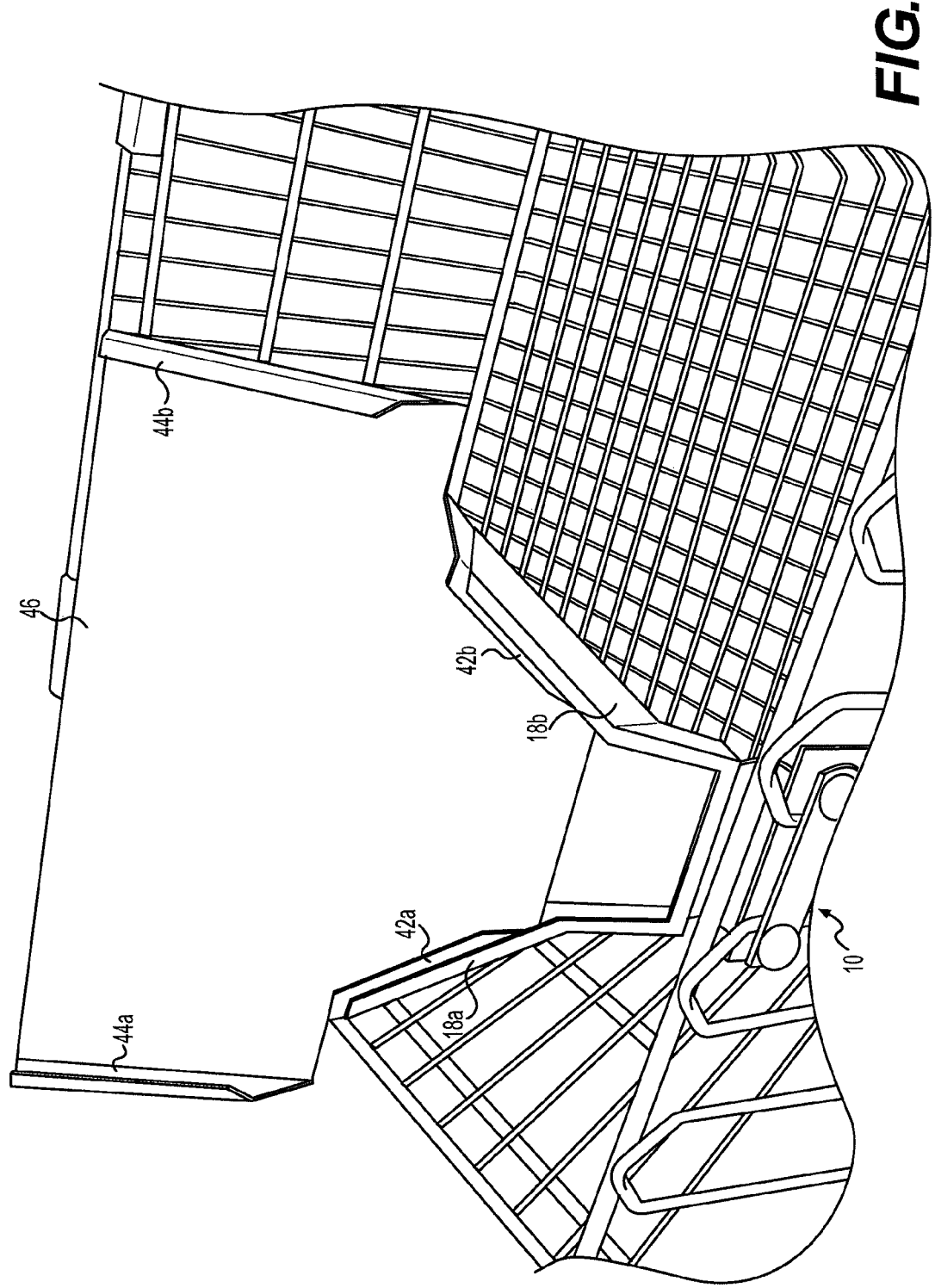
FIG. 7 shows a perspective view of an expansion holding portion inserted in the mobile device holder according an aspect of the present disclosure.
Figure 8:
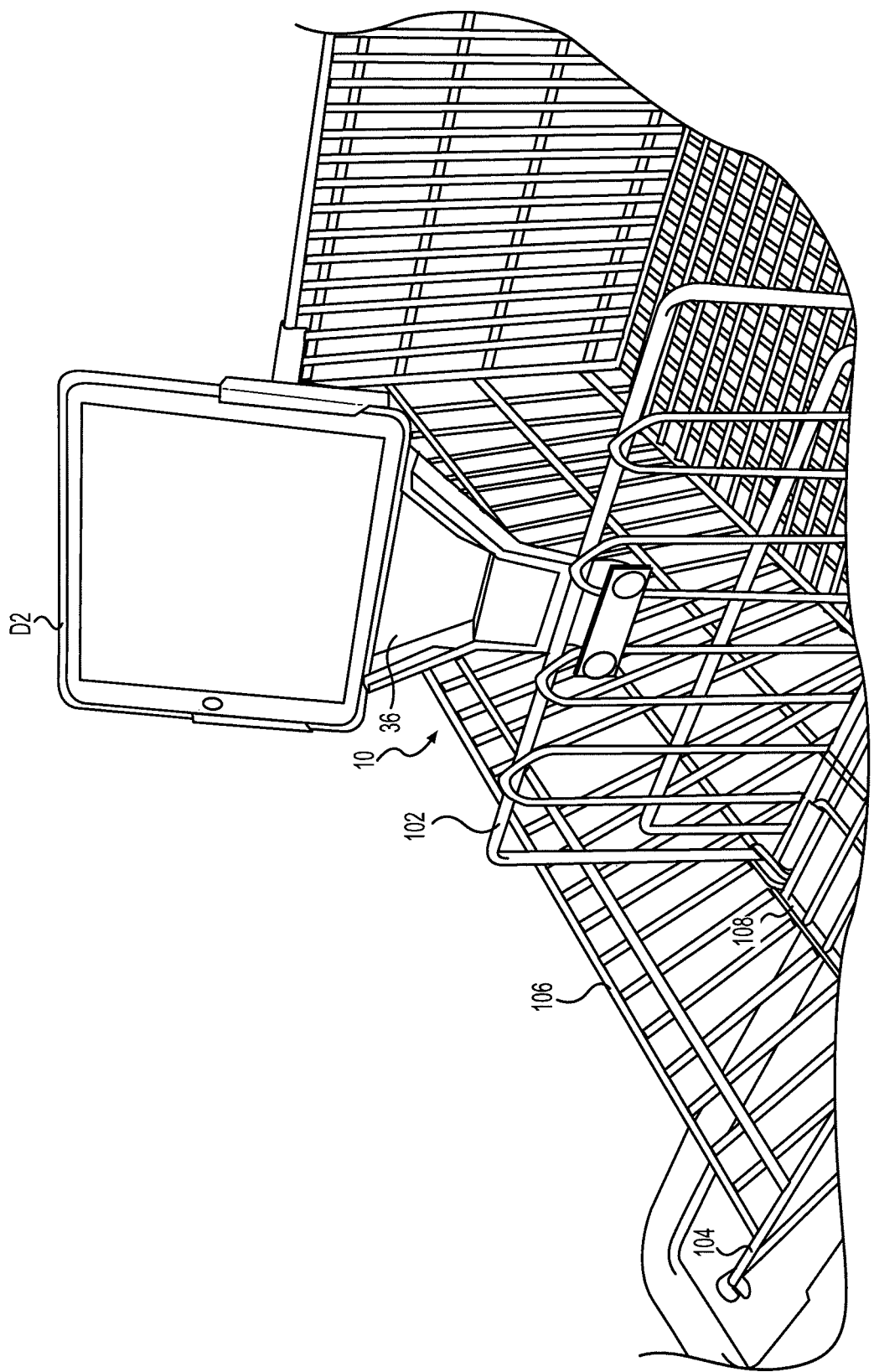
FIG. 8 shows a perspective view of an expansion holding portion holding a mobile device and inserted in a mobile device holder according an aspect of the present disclosure.

As shown in, e.g., FIGS. 1, 4, 5, 7 and 8, the mobile device holder 10 is preferably attachable to a pivotable secondary basket 102 of a shopping cart 100. As best shown in FIG. 8, the secondary basket 102 of a shopping cart 100 is typically positioned in front of the end gate 104 and within the main basket 106. In the shopping art, a folding child seat 108 may be positioned between the secondary basket 102 and the end gate 104, such that the child seat may be folded when the secondary gate is pulled toward the cart pusher/shopper and against the end gate to make more room for items in the main basket 106. This arrangement also allows for the end gate 104, folding child seat 108 and secondary basket 102 to pivot together toward the front of the shopping cart 100 when another shopping cart is nested with the shopping cart. By mounting the mobile device holder 10 to the top of the secondary basket 102, nesting of the shopping carts is still possible, since the end gate 104, folding child seat 108 and secondary basket 102 pivot together, thereby conserving floor space.

The mobile device holder 10 has a mount 24 as a base for mounting to a shopping cart 100. In an embodiment (as shown, e.g, in FIGS. 1, 4, 5 and 7-9) the mount 24 is mounted to the shopping cart using a mounting bracket 28 secured by bolts 26 such that the secondary basket 102 is sandwiched between the mount 24 and the mounting bracket. It is also understood by those of skill in the art that the mobile device holder 10 may be mounted to the shopping cart 100 by other methods than the mounting bracket 28 and bolts 26, including but not limited to a bayonet-type attachment, spring-loaded attachment, and the like. Alternatively, the mobile device holder 10 may be integrally formed with the secondary basket such that mounting hardware is not needed.

In embodiments where the mobile device holder 10 is mounted to the top of the secondary basket 102, the mobile device holder is also provided with a generally C-shaped clearance section 30 which provides a clearance for a crossbar 110 of the secondary basket 102.

The shape of the mobile device holder 10 allows it to accommodate devices of different dimensions and/or for accommodating different orientations of the same device. FIG. 4 shows a mobile device D1 (here, an iPhone) being vertically/held upright in the lower holding portion channels 16a, 16b and shelf channel 22. In other words, three edges of the mobile device D1 are each respectively held on three sides within the lower holding portion channels 16a, 16b and shelf channel 22. In situations where the mobile device is narrower than the mobile device D1, then it may be held by the shelf channel.

In situations where the mobile device is larger than the mobile device D1 or where the mobile device D1 is held horizontally, the mobile device is held in the pair of opposed upper holding portion channels 18a, 18b. In other words, lower edges of the mobile device D1 are both respectively held on three sides within the upper holding portion channels 18a, 18b.

The channels 16a, 16b, 18a, 18b, and 22 may be generally U-shaped to secure a mobile device on three sides, or alternatively the channels may be generally L-shaped to secure a mobile device on two sides. In the U-shaped channel arrangement, the mobile device is inserted into the top of the device holder 10, while in the L-shaped channel arrangement, the mobile device may be inserted into either the top or the front of the device holder. In a feature of the disclosure, the mobile device holder 10 is mounted at a reclined angle so that the mobile device therein is more easily viewed. In the L-shaped channel latter arrangement, it is preferred that the mobile device holder 10 is even further reclined to prevent the mobile device from falling out of the front of the device holder 10.

The mobile device holder 10 preferably has an open front end section to facilitate the user's contact with the keys and/or touchscreen of a mobile device, although it is understood by those of skill in the art that one or more crossbars connecting one or more pairs of channels 16a, 16b, 18a, 18b may be provided to further secure a mobile device to the mobile device holder 10. Although the figures show the mobile device holder 10 as having a closed rear section 32, it is understood that the rear section may have one or more openings (e.g., to save weight or cost of materials), including but not limited to perforations, latticework, crossbars and like.

Figure 10:
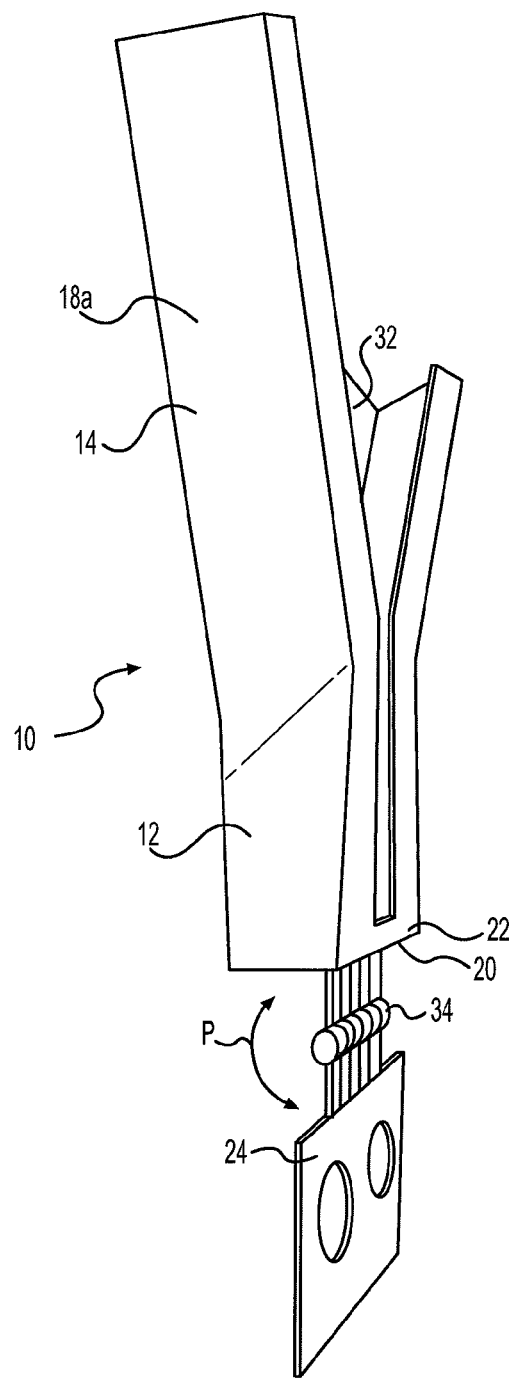
FIG. 10 shows a side elevational view of the mobile device holder according an additional aspect of the present disclosure.

In certain situations it may be desirable to move the mobile device holder 10 out of the way (e.g., when transporting a child in the child seat 108). FIG. 10 shows an embodiment wherein a hinge 34 is provided between the shelf 20 and the mount 24. This hinge 10 allows the lower holding portion 12 and the upper holding portion 14 to be pivoted in path P relative to the mount 24. The lower holding portion 12 and the upper holding portion 14 to be pivoted in path P may be slightly pivoted to adjust the viewing angle of the mobile device or to keep the mobile device holder out of reach of a child sitting in the folding child seat 108, or may be completely pivoted so that the lower holding portion 12 and the upper holding portion 14 engage the mount 24 (e.g., when the mobile device holder 10 is not in use), or any degree in between.

Further, the hinge 34 may be spring loaded to bias the lower holding portion 12 and the upper holding portion 14 in a predetermined direction (either up or down) along path P.

In situations where mobile devices are too large to fit between the pair of opposed upper holding portion channels 18a, 18b, an expansion holding portion 36 may be removably inserted into the upper holding portion 14, as shown in FIGS. 6-9. The expansion holding portion 36 includes two portions, namely, an upper expansion holding portion 38 and a lower expansion holding portion 40. The lower expansion holding portion 40 is generally rectangular in shape while the upper expansion holding portion 38 is generally trapezoidal in shape. While the expansion holding portion 36 shows the lower expansion holding portion 40 and the upper expansion holding portion 38 as being unitarily constructed, it is understood by those of skill in the art that the lower expansion holding portion 40 and the upper expansion holding portion 38 may be independently constructed and then affixed to each other.

The lower expansion holding portion 40 includes a pair of opposed lower expansion holding portion channels 42a, 42b, and the upper holding expansion portion 38 includes a pair of opposed upper expansion holding portion channels 44a, 44b. The pair of opposed lower expansion holding portion channels 42a, 42b create generally the same angle as the pair of upper holding portion channels 18a, 18b of the mobile device holder 10, so that the pair of lower expansion holding portion channels 42a, 42b can be held within the pair of upper holding portion channels 18a, 18b of the mobile device holder 10, thereby securing the expansion holding portion 36 to the mobile device holder, as shown in FIGS. 7-8.

Figure 9:
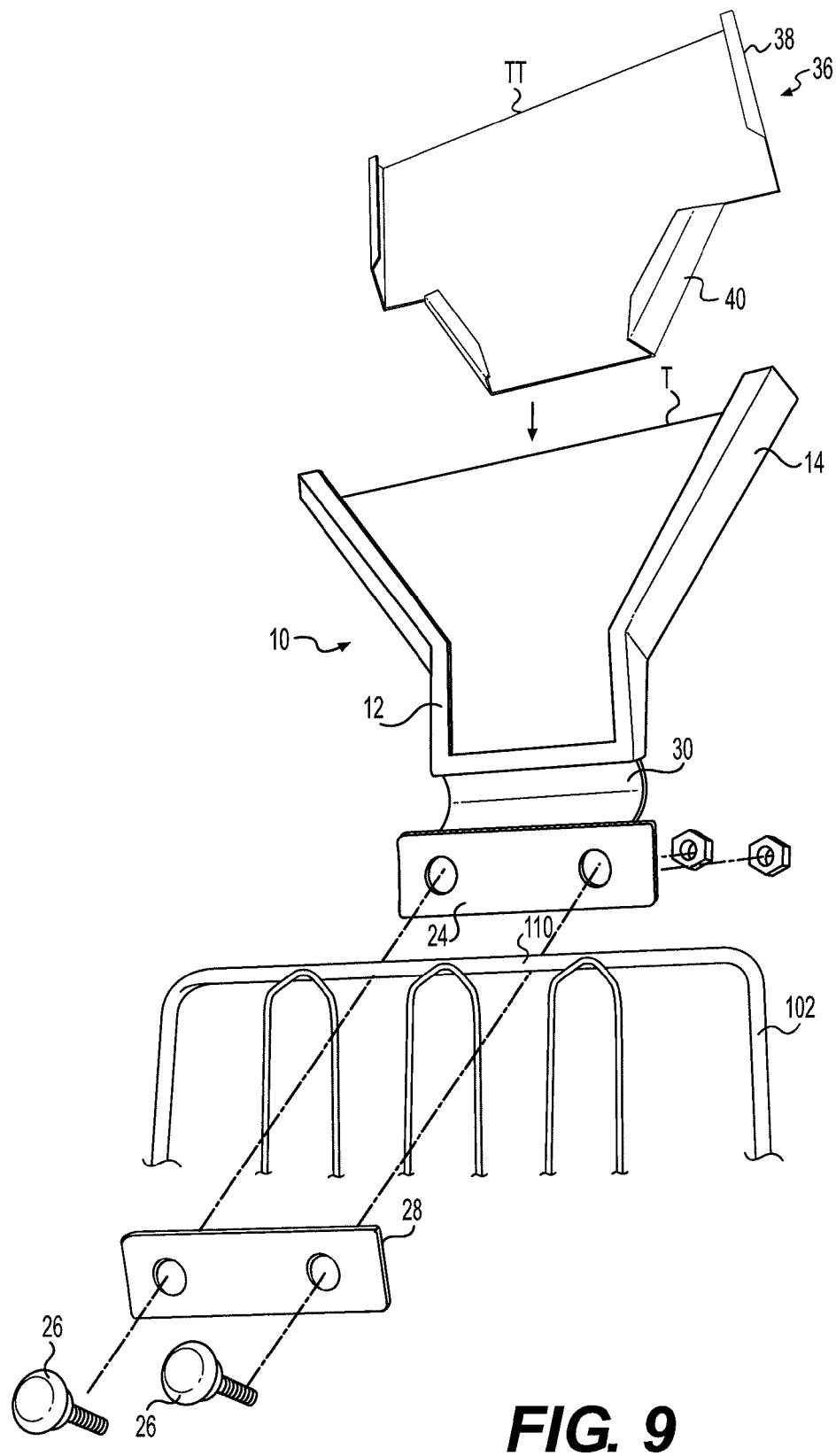
FIG. 9 shows an exploded view of an installation of a mobile device holder according an aspect of the present disclosure.

As can be seen in FIG. 8, a mobile device D2 (here, an iPad) larger than the mobile device D1 is shown held in the upper holding expansion portion 38. The channels 42a, 44a on each side of the expansion holding portion 36 may be separate (i.e., discontinuous) from each other (as shown in FIGS. 6-9), such that the mobile device D2 rests on the top of the pair of opposed upper expansion holding portion channels 44a, 44b. Alternatively and as shown in FIG. 9, a connecting portion connecting the pair of opposed upper expansion holding portion channels 44a, 44b with the pair of opposed lower expansion holding portion channels 42a, 42b such that the mobile device D2 can rest atop the connecting portions. In a non-limiting feature of the disclosure, the distance between the pair of opposed upper expansion holding portion channels 44a, 44b may be adjustable so that the upper holding expansion portion 38 can hold mobile devices D2 of different widths. Different embodiments may provide for different amounts of adjustment of the distance between the pair of opposed upper expansion holding portion channels 44a, 44b, from 1-2 millimeters (due to flexing of the channels 44a, 44b themselves) to 4-5 centimeters or more, and any suitable range therebetween.

The expansion holding portion 36 preferably has an open front end section to facilitate the user's contact with the keys and/or touchscreen of the mobile device D2, although it is understood by those of skill in the art that one or more crossbars connecting one or more pairs of channels 42a, 42b, 44a, 44b may be provided to further secure a mobile device to the expansion holding portion 36. Although the figures show the expansion holding portion 36 as having a closed rear expansion section 46, it is understood that the rear section may have one or more openings (e.g., to save weight or cost of materials), including but not limited to perforations, latticework, crossbars and like.

The expansion holding portion 36 preferably has an open bottom end B so that mobile device D1 may still be held within the lower holding portion channels 16a, 16b separately or while the mobile device D2 is held within the upper expansion holding portion channels 44a, 44b.

The channels 42a, 42b, 44a, 44b may be generally U-shaped to secure the mobile device D2 on three sides, or alternatively the channels may be generally L-shaped to secure a mobile device on two sides. In the U-shaped channel arrangement, the mobile device D2 is inserted into the top TT of the expansion holding portion 36, while in the L-shaped channel arrangement, the mobile device may be inserted into either the top or the front of expansion holding portion 36. In a feature of the disclosure, when the expansion holding portion 36 is used in conjunction with the mobile device holder 10 it is preferred that the upper holding portion channels 18a, 18b of the mobile device holder 10 are U-shaped rather than L-shaped in order to help prevent the expansion holding portion 36 from disengaging from the mobile device holder 10.

The mobile device holder 10 and expansion holding portion 36 may be made of any suitable material rigid enough to hold a mobile device, including but not limited to plastic and metal. Further, while the embodiments described herein refer to the mobile device holder 10 attachable to a shopping cart 100, it is appreciated by those skilled in the art that the mobile device holder 10 is attachable to any structure which may be mobile or stationary, such as an automobile, a stationary exercise machine, and the like.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A mobile device holder comprising:
   an uppermost end and a lowermost end;
   a lower holding portion having a pair of opposed lower holding portion channels and a shelf;
   an upper holding portion having a pair of opposed upper holding portion channels, the pair of opposed upper holding portion channels uniformly extending at an angle oblique to the pair of opposed lower holding portion channels and extending from the uppermost end to an attachment point to the lower holding portion and aligned with the pair of opposed lower holding portion channels;
   a base connected to the shelf of the lower holding portion and extending to the lowermost end; and
   an expansion holding portion removably insertable in the upper holding portion, the expansion holding portion comprising:
      an upper expansion holding portion having a pair of opposed upper expansion holding portion channels; and
      a lower expansion holding portion having a pair of opposed lower expansion holding portion channels, the pair of opposed lower expansion holding portion channels converging in a direction away from the upper expansion holding portion and aligned with the pair of opposed upper expansion holding portion channels, the upper expansion holding portion affixed to the lower expansion holding portion.

2. The mobile device holder according to claim 1, wherein the lower holding portion is generally rectangular in shape and the upper holding portion is four-sided shape having a single pair of parallel sides.

3. The mobile device holder according to claim 1, wherein each channel of the pair of opposed lower holding portion channels and each channel of the pair of opposed upper holding portion channels is generally U-shaped.

4. The mobile device holder according to claim 3, wherein each channel of the pair of opposed lower holding portion channels extends substantially the entire length of the lower holding portion, and each channel of the pair of opposed upper holding portion channels extends substantially the entire length of the upper holding portion.

5. The mobile device holder according to claim 1, wherein each channel of the pair of opposed lower holding portion channels and each channel of the pair of opposed upper holding portion channels is generally L-shaped.

6. The mobile device holder according to claim 1, further comprising a clearance section connected to the lower holding portion between the shelf and the base.

7. The mobile device holder according to claim 6, wherein the clearance section comprises a generally U-shaped channel.

8. The mobile device holder according to claim 1, wherein the base comprises a mount removably attachable to a shopping cart.

9. The mobile device holder according to claim 8, wherein the mount is attachable to a collapsible basket of the shopping cart.

10. The mobile device holder according to claim 1, further comprising a front section and a rear section defined between the pair of opposed lower holding portion channels the pair of opposed upper holding portion channels, wherein one of the front section and the rear section is open.

11. The mobile device holder according to claim 10, wherein the other of the front section and the rear section is generally closed.

12. The mobile device holder according to claim 1, wherein the lower holding portion and the upper holding portion collectively define a general Y-shape.

13. The mobile device holder according to claim 1, wherein the pair of opposed lower holding portion channels is one of continuous and discontinuous with the pair of opposed upper holding portion channels.

14. The mobile device holder according to claim 1, wherein the lower holding portion is pivotable relative to the base.

15. The mobile device holder according to claim 1, wherein one upper holding portion channel of the pair of opposed upper holding portion channels creates an oblique angle with one lower holding portion channel of the pair of opposed lower holding portion channels, the one upper holding portion channel and the one lower holding portion channel located on the same side of the mobile device holder.

16. The mobile device holder according to claim 1, wherein the pair of opposed lower holding portion channels is parallel.

17. The mobile device holder according to claim 1, further comprising a front expansion section and a rear expansion section defined between the pair of opposed lower expansion holding portion channels the pair of opposed upper expansion holding portion channels, wherein one of the front expansion section and the rear expansion section is open.

18. The mobile device holder according to claim 1, wherein the pair of opposed lower expansion holding portion channels create the same angle as the pair of opposed upper holding portion channels when the expansion holding portion is inserted in the upper holding portion.

19. The mobile device holder according to claim 1, wherein an end of each channel of the pair of opposed lower expansion holding portion channels is open.

20. The mobile device holder according to claim 1, wherein the pair of opposed upper expansion holding portion channels is parallel.

21. The mobile device holder according to claim 1, wherein the pair of opposed upper holding portion channels create an angle different from that of the pair opposed lower holding portion channels.

22. The mobile device holder according to claim 1, wherein the shelf comprises a shelf channel aligned with the pair of lower holding portion channels.

23. The mobile device holder according to claim 1, wherein the distance between the pair of opposed upper expansion holding portion channels is adjustable.

24. A shopping cart comprising:
a main basket;
a secondary basket configured to swing upward relative to the main basket when the shopping cart is nested with another shopping cart; and
a mobile device holder comprising:
a lower holding portion having a pair of opposed lower holding portion channels and a shelf;
an upper holding portion having a pair of opposed upper holding portion channels, the pair of opposed upper holding portion channels diverging in a direction away from the lower holding portion and aligned with the pair of opposed lower holding portion channels, the upper holding portion affixed to the lower holding portion;
a base connected to the shelf of the lower holding portion and directly attached to the secondary basket; and
an expansion holding portion removably insertable in the upper holding portion, the expansion holding portion comprising:
an upper expansion holding portion having a pair of opposed upper expansion holding portion channels; and
a lower expansion holding portion having a pair of opposed lower expansion holding portion channels, the pair of opposed lower expansion holding portion channels converging in a direction away from the upper expansion holding portion and aligned with the pair of opposed upper expansion holding portion channels, the upper expansion holding portion affixed to the lower expansion holding portion.

25. The shopping cart according to claim 24, wherein:
the mobile device holder further comprises an uppermost end and a lowermost end; and
the pair of opposed upper holding portion channels uniformly extend at an angle oblique to the pair of opposed lower holding portion channels, and further extend from the uppermost end to an attachment point to the lower holding portion.

* * * * *